(12) United States Patent
Wright et al.

(10) Patent No.: US 10,985,000 B2
(45) Date of Patent: Apr. 20, 2021

(54) CHEMICAL ANALYZER WITH MEMBRANE

(71) Applicant: INFICON, INC., East Syracuse, NY (US)

(72) Inventors: Kenneth Charles Wright, Fayetteville, NY (US); Guido F. Verbeck, IV, Lewisville, TX (US)

(73) Assignee: INFICON, Inc., East Syracuse, NY (US)

( * ) Notice: Subject to any disclaimer, the term of this patent is extended or adjusted under 35 U.S.C. 154(b) by 133 days.

(21) Appl. No.: 15/882,173

(22) Filed: Jan. 29, 2018

(65) Prior Publication Data

US 2018/0197727 A1 Jul. 12, 2018

Related U.S. Application Data

(63) Continuation of application No. 15/021,601, filed as application No. PCT/US2014/055405 on Sep. 12, 2014, now abandoned.

(60) Provisional application No. 61/877,603, filed on Sep. 13, 2013.

(51) Int. Cl.
*H01J 49/04* (2006.01)
*H01J 49/42* (2006.01)

(52) U.S. Cl.
CPC ...... *H01J 49/0427* (2013.01); *H01J 49/0495* (2013.01); *H01J 49/4215* (2013.01)

(58) Field of Classification Search
None
See application file for complete search history.

(56) References Cited

U.S. PATENT DOCUMENTS 7,161,145 B2 * 1/2007 Oser ............... H01J 49/0431
250/282
2009/0317445 A1 * 12/2009 Van Bruggen ....... A61M 37/00
424/423

* cited by examiner

*Primary Examiner* — Xiaoyun R Xu
(74) *Attorney, Agent, or Firm* — Barclay Damon LLP (57) ABSTRACT

A system for analyzing an analyte is described herein. The system includes a chamber having an inlet and a semi-permeable membrane arranged to seal the inlet. The semi-permeable membrane includes a cross-linked mixture of a first compound and a second compound. The system can also include a radiation source arranged in the vacuum chamber, the radiation source spaced apart from the semi-permeable membrane and adapted to irradiate the semi-permeable membrane with electromagnetic radiation at a frequency at least partially absorbed by the semi-permeable membrane.

18 Claims, 11 Drawing Sheets

CHEMICAL ANALYZER WITH MEMBRANE

CROSS-REFERENCE TO RELATED APPLICATIONS

This application is a continuation of U.S. 371 application Ser. No. 15/021,601, filed Mar. 11, 2016 and entitled "CHEMICAL ANALYZER WITH MEMBRANE", which was a National Stage Entry of a PCT Application No. PCT/US14/55405, filed Sep. 12, 2014 and entitled "CHEMICAL ANALYZER WITH MEMBRANE", which claims the benefit of and priority to U.S. Provisional Patent Application Ser. No. 61/877,603, filed Sep. 13, 2013, and entitled "CHEMICAL ANALYZER WITH MEMBRANE," the entirety of which is incorporated herein by reference.

TECHNICAL FIELD

The present application generally relates to analytical systems such as mass spectrometers.

BACKGROUND

Mass spectrometers generally ionize small volumes of analytes in a vacuum chamber. The properties of those ions can then be determined using electrical techniques, and properties of the analytes inferred from the properties of the ions. Membrane Inlet Mass Spectrometry (MIMS) is a technique for introducing analyte molecules into the vacuum chamber. A semi-permeable membrane interface (e.g., a silicone polymer) separates a gaseous or liquid sample matrix (e.g., carrier gas, ambient air, water) from a much lower pressure region that is created within a mass spectrometer. Analytes, e.g., molecules, pass through the semi-permeable membrane preferentially to transport molecules from a sample matrix. Compared to mass spectrometry systems having direct sample inlets such as an orifice or capillary, a MIMS inlet permits only a much smaller number of matrix molecules into the vacuum of the mass spectrometer for the same number of analyte molecules. This permits constructing mass spectrometry systems having substantially the same sensitivity as other systems, but with a reduced gas load on the vacuum pumps responsible for maintaining the low pressure of the mass spectrometer. Resulting systems can be built with more robust vacuum pumps which utilize lower power, enabling the construction of smaller, more durable, and thus more portable mass spectrometer instruments.

MIMS instruments have demonstrated their largest commercial successes in the environmental and security fields. These applications typically employ compact instruments featuring ruggedized and low-power vacuum pumping systems. Instruments of this type include, for example, the family of Mobile Mass Spectrometer instruments produced by Bruker Daltonik GmbH and the battery operated HAPSITE instruments developed by INFICON, Inc. These instruments use linear quadrupole mass filter detectors and optional gas chromatography sample introduction systems in order to provide a high sensitivity analysis for chemical warfare agents (CWA) and a wide range of toxic industrial chemicals (TICs) in a rugged package. Instruments such as those produced by Kore Technology Ltd also use a membrane inlet; however, these instruments make use of a time-of-flight (TOF) mass spectrometry technology instead of a quadrupole mass filter. The above-noted systems take advantage of MIMS to enable the use of low speed sputter ion pumps or these pumps combined with small chemical getter pumps to enable portable or semi-portable operation. Other pumps such as small turbo, molecular, or scroll pumps are also used in some of these systems. Numerous other implementations of MIMS instruments have been developed, e.g., for research applications. One such system was developed for submersed water sampling. In this latter device, the inlet membrane permits the introduction of analyte molecules from a water matrix while withstanding the pressure of up to several hundred meters of water.

A limitation of some prior MIMS instruments is that analyte molecules pass thorough the semi-permeable membrane by diffusion. Relatively large molecules such as pesticides, narcotics, and some explosives diffuse though the membrane much more slowly than relatively small molecules, such as many volatile organic chemicals (VOCs). Some prior MIMS systems are thus restricted to detecting VOCs or only the smallest semivolatile organic compounds (SVOCs). In general, SVOC compounds tend to be larger molecules than VOCs and thus diffuse more slowly through a MIMS inlet. Some success has been made in the detection of larger molecules by using much higher membrane temperatures in order to speed the diffusion process. One prior art approach involved heating the membrane directly with the photon flux from the ion source filament; however, there are limitations to using higher temperature as the sole approach. For many analytes, high temperature reduces sensitivity by lowering the analyte partition coefficient into the membrane, and for silicone membranes—the most prevalent type of semi-permeable membrane—contact with small amounts of water or oxygen at elevated temperature causes liberation of volatile silicon containing compounds. These liberated materials coat and degrade the electrode surfaces of the mass spectrometer. Additionally, higher temperature may cause labile analytes to degrade.

Moreover, mass spectrometers are frequently used during oil and natural-gas drilling. In these applications, it is useful to monitor the composition of the hydrocarbons being drilled. In natural gas drilling, these are often saturated hydrocarbons such as methane and propane. It is also useful to test for unsaturated hydrocarbons in the environment around the drill site. Prior schemes require separate analyzers for these two types of test.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

The attached drawings are for purposes of illustration and are not necessarily to scale.

DETAILED DESCRIPTION

In the following description, some aspects will be described in terms that would ordinarily be implemented as software programs. Those skilled in the art will readily recognize that the equivalent of such software can also be constructed in hardware, firmware, or micro-code. Because data-manipulation algorithms and systems are well known, the present description will be directed in particular to algorithms and systems forming part of, or cooperating more directly with, systems and methods described herein. Other aspects of such algorithms and systems, and hardware or software for producing and otherwise processing the signals involved therewith, not specifically shown or described herein, are selected from such systems, algorithms, components, and elements known in the art. Given the systems and methods as described herein, software not specifically shown, suggested, or described herein that is useful for implementation of any aspect is conventional and within the ordinary skill in such arts.

As used herein, the term "vacuum chamber" does not imply that the inside of the chamber has to be at a pressure of 0 Pa. A vacuum chamber has a pressure inside the chamber that is lower than a pressure outside the chamber. In an example, the inside pressure is substantially below atmospheric, i.e., <<101.325 kPa. The pressure can be selected according to the desired sensitivity of the measurement and the type of detector being used.

In various embodiments, a chamber can include an enclosure in which a difference in concentration of a component, substance, or analyte is maintained across the boundary of the chamber. In an example, a chamber can be substantially free of nitrogen compared to a standard atmosphere, which includes substantial amounts of nitrogen.

Figure 1:
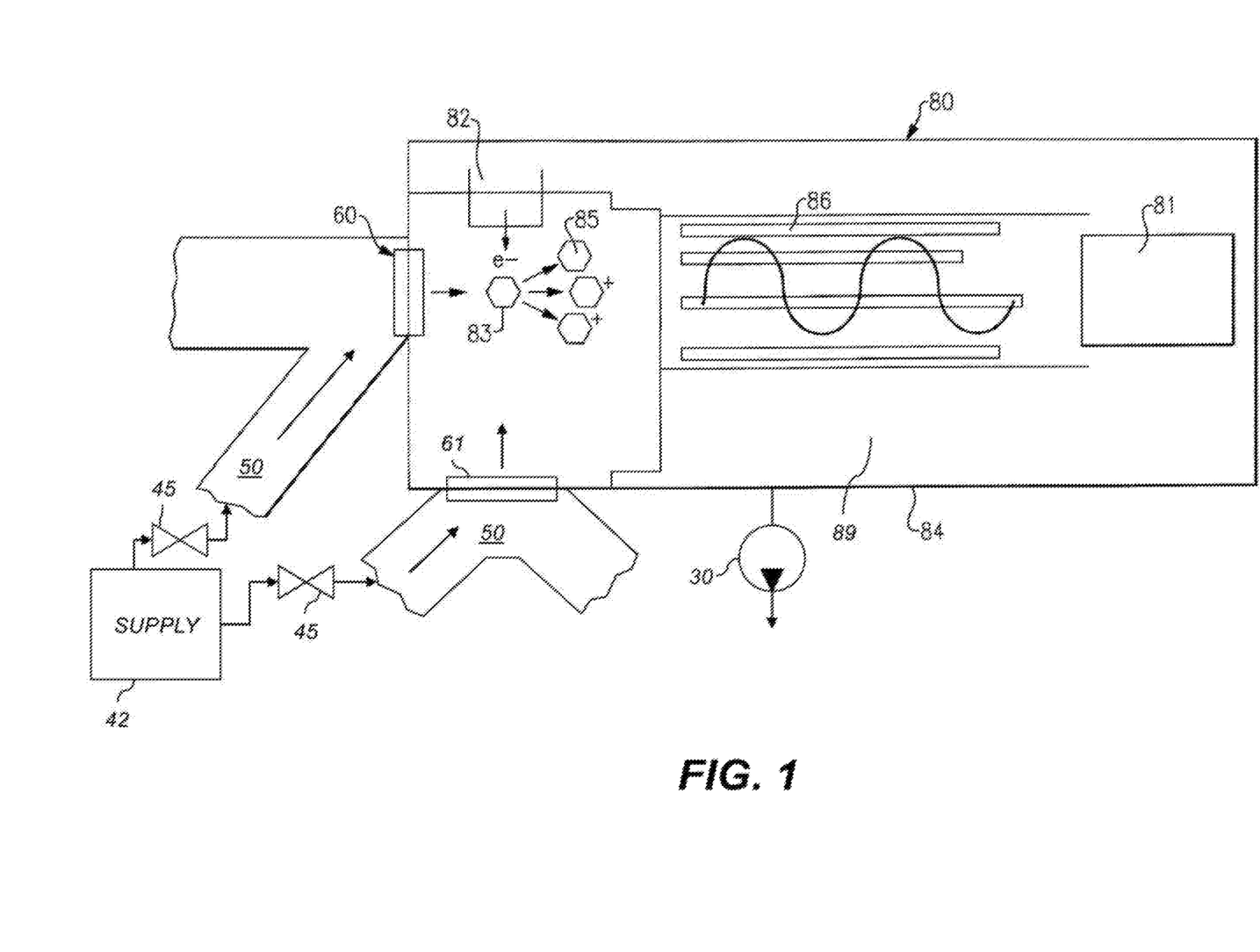
FIGS. 1-3 are schematic views of exemplary MIMS systems.

FIG. 1 schematically shows a MIMS system in which a membrane assembly 60 is positioned at the inlet of a mass spectrometer, herein labeled as 80. The mass spectrometer 80 is defined by a housing 84 that includes an ion source 82 positioned at the inlet side of the housing. The interior 89 of housing 84 can be pumped down to vacuum, e.g., by pump 30. The ion source includes a filament (not shown) or other means for producing a stream of electrons (e−) that are injected into an ionization volume or chamber along with a sample gas 83 which passes through the membrane assembly 60 at the inlet of the mass spectrometer 80. Impact by the electrons with the incoming gas molecules 83 produces the formation of positive ions 85 that are caused to be accelerated into a mass filter 86, such as a quadrupole mass filter, in which masses are scanned for detection by a sensor 81, such as an electron multiplier or a Faraday cup, which is disposed at the opposite end of the housing 84.

In various aspects, supply 42 provides material 50, e.g., an analyte, or a mixture or composition containing the analyte, via valves 45 selectively to membrane assembly 60 or to membrane assembly 61. Supply 42 can include a pump adapted to either apply positive pressure to push material 50 towards membrane 60 or to apply negative pressure to pull material 50 across membrane 60. In other examples, two different membranes can be manually or robotically attached to the inlet of chamber 89 sequentially.

In an example, the analytes 83 of interest are non-polar molecules that are more soluble in the membrane 60 material than the bulk gas (e.g. air) or liquid (e.g. water). Therefore, gas 83 has a much higher concentration of the analyte than the original sample 50 from supply 45. Some components of substance 50 other than analyte 83 may pass through membrane 60, but often not a significant amount. Membranes can be flat or in other shapes. The membrane is a semi-permeable membrane.

In an example, the HAPSITE gas chromatography/mass spectroscopy (GC/MS) unit manufactured by INFICON uses a flat membrane. Other types of MS units, such as continuous process monitors (CPM), permit a very small amount of material 50 to leak into interior 89, e.g., an MS vacuum chamber. Such analyzers permit measuring various gas species but can have difficulty measuring low concentrations (e.g. below 1 ppm) because only a small amount of gas can be handled by pump 30 keeping interior 89 under vacuum. Using a membrane permits increasing the relative proportion of analyte 83 to material 50, which permits measuring lower ppm levels of analyte 83 without increasing the pump capacity (and thus size, cost, and wattage) of vacuum pump 30.

As used herein, a "semi-permeable membrane" is a structure that permits some chemicals or analytes to pass through the membrane faster than other chemicals or analytes. In an example, Dow Corning™ Silastic™ Q7-4750 biomedical/pharmaceutical grade platinum-cured silicone material will pass unsaturated hydrocarbons (e.g. "BTEX" which is an acronym that stands for benzene, toluene, ethylbenzene, and xylenes) but substantially block saturated hydrocarbons (e.g., methane (natural gas), propane, or butane).

Many schemes use a PDMS membrane material; non-polar molecules pass through the PDMS membrane material quickly and polar molecules do not. It has been determined that there is at least one membrane material that will permit one class of non-polar molecules though while effectively blocking another. Dow Corning™ Silastic™ Q7-4750 biomedical/pharmaceutical grade platinum-cured silicone material can be used. This material will let unsaturated hydrocarbons through (e.g. "BTEX" which is an acronym that stands for benzene, toluene, ethylbenzene, and xylenes) but will block saturated hydrocarbons (e.g. methane (natural gas), propane, butane, etc).

This selectively permeable membrane material permits monitoring toxic chemicals, e.g., for compliance with OSHA and EPA limits on BTEX (e.g., <1 ppm in air). Such monitoring can be performed to detect very low levels of BTEX in air at oil and gas well sites, including fracking sites. Prior schemes can only effectively detect BTEX in water, not air. Most prior schemes (including regular MIMS) cannot detect BTEX in the large concentration of saturated hydrocarbons in the air at a drill site. This is because mass spectroscopy bombards analytes 83 with electrons, which can cause long-chain hydrocarbons to break into shorter chains. These shorter chains can have masses very similar to benzene or other toxic or restricted chemicals. Consequently, it can be difficult to determine whether a mass signal corresponding to a six-carbon molecule indicates the presence of benzene or an ionic hexane fragment of a long hydrocarbon. A standard membrane inlet may be useful for detecting low ppb levels of BTEX in otherwise clean air, but such schemes generally do not provide enough signal to be detectable when swamped by the methane or other compounds. Q7-4750 blocks the high concentration gas (e.g. methane) but allows the BTEX to pass through. This advantageously permits filtering out the saturated hydrocarbons to measure BTEX at acceptable signal-to-noise ratios.

In various aspects, one detector system is used with multiple switchable membranes of different materials, e.g., regular PDMS and Silastic™ Q7-4750. At a drill site a company could use the PDMS membrane to monitor the bulk gas being produced and use mass spectroscopy (MS) to determine what compounds are present. Different mixtures of gases are more efficiently refined at different refineries and this information permits determining which refinery may be best equipped to handle the gas. Periodic measurements can be taken using the Silastic™ Q7-4750 to check that there are no BTEX levels above the EPA or OSHA limits being emitted at the site. This inventive analysis is useful for production and for monitoring safe operation. In various aspects, the membranes can be different dimensions to match desired detection limits/gas flow, etc. In an example, the PDMS membrane can sample the gas from inside the well and the Silastic™ Q7-4750 can pull in outside air depending on the application.

Figure 10:
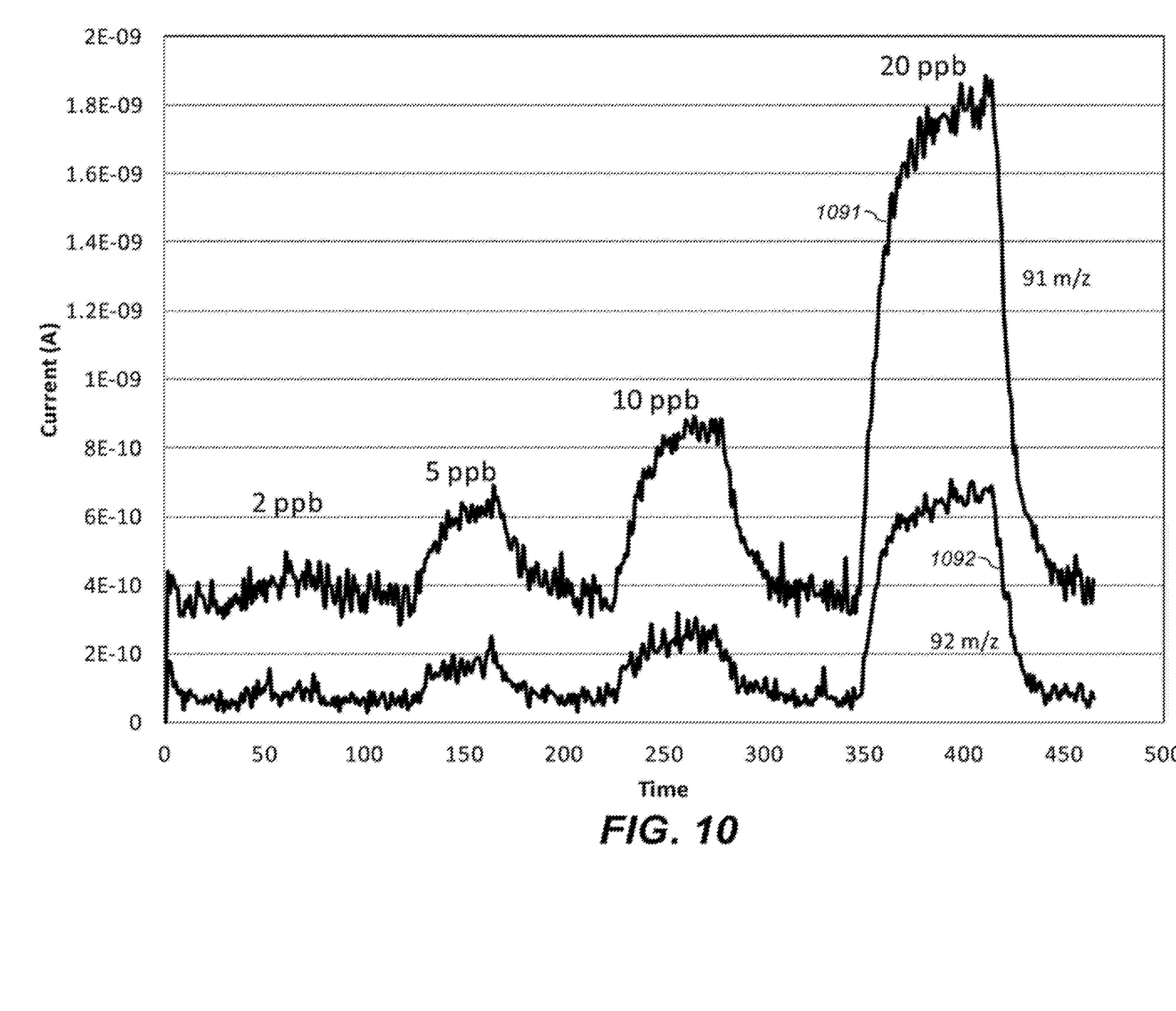
FIG. 10 shows experimental data.

FIG. 10 shows experimental data from an experiment using a Q7-4750 membrane on a mass spectrometer. The abscissa is elapsed time of the experiment (a.u.) and the ordinate is current from the detector in the mass spectrometer. Toluene in air was applied to the membrane at a succession of concentrations, labeled on FIG. 10 in parts per billion ("ppb"): 2 ppb, 5 ppb, 10 ppb, then 20 ppb. The ppb readings are ppbv (parts per billion by volume) of toluene in air outside the vacuum system. The membrane was not heated.

After electron bombardment, ionized toluene was detected with a charge to mass ratio of m/z=92, shown by curve 1092. Cations of benzene+$CH_2$ (see the Paper entitled "Mass Spectrometry Handout") were also detected, with m/z=91, shown by curve 1091. For toluene, 92 m/z is referred to as M+ and 91 m/z is referred to as (M−1)+ where M represents the intact molecular ion and (M−1) is that ion minus one hydrogen atom. The + means one positive charge. As shown, toluene was clearly detected at 5 ppb, and some signal was evident even at 2 ppb. This level of sensitivity is a significant improvement over current mass spectrometers.

Referring back to FIG. 1, in an example, supply 42 (or processor 986, FIG. 9, controlling supply 42 and valves 45) can first selectively supply material 50 to membrane 60 but not to membrane 61.

In various aspects, multiple inlets on an MS chamber permit having back-ups of the same membrane, or sampling from different locations. Different membranes can be used having respective, different permeation rates (different sensitivities) for different analytes. Such configurations can be used to analyze complex mixtures. In other aspects, membranes 60 and 61 have substantially the same composition but different thicknesses. The thinner membrane can be used to measure lower concentration levels and the thicker membrane can be used to measure higher concentration levels. In other aspects, the membranes 60, 61 can be substantially identical and can serve as hot spares. If one membrane develops a puncture or otherwise fails, its ends can be plugged and another membrane can be used.

In various aspects, one MS system has multiple membranes with dedicated liquid and air inlets. This system can provide targeted selectivity, e.g., using multiple types of membranes, for either liquid or gaseous samples.

In various aspects, membranes as described above are used with getter pumps. This permits constructing portable MS systems.

Ways to interface a membrane to the mass spectrometer (MS) include those listed below as #1-#3.

1) A sheet membrane, e.g., as shown in FIG. 1. Air or water is on one side and vacuum on the other. This membrane is often supported with a porous material on vacuum/MS side (interior 89). However, the sample side surface (facing pump 45) can become contaminated and block anything from getting through. Also, the support material (not shown) can adsorb the analyte(s), leading to carryover or baseline-offset problems.

2) A tube can extend from the interior 89. Sample fluid 50 (air or water) can be applied on the outside and vacuum on the inside, i.e., the inside of the tube can be connected to interior 89. Often a support material (porous tube or spring) is placed inside the tube (in vacuum) to prevent the tube from collapsing. However, the support material is on the MS side 89 and so can adsorb the analyte. Moreover, the tube has no active flow through it so it can require a significant amount of time for high concentrations of analyte to diffuse out of the tube.

3) A tube can also extend into the interior 89, and the sample can be pumped through the inside of the tube. The outside of the tube can be exposed to the vacuum. An example is shown in FIG. 2.

Figure 2:
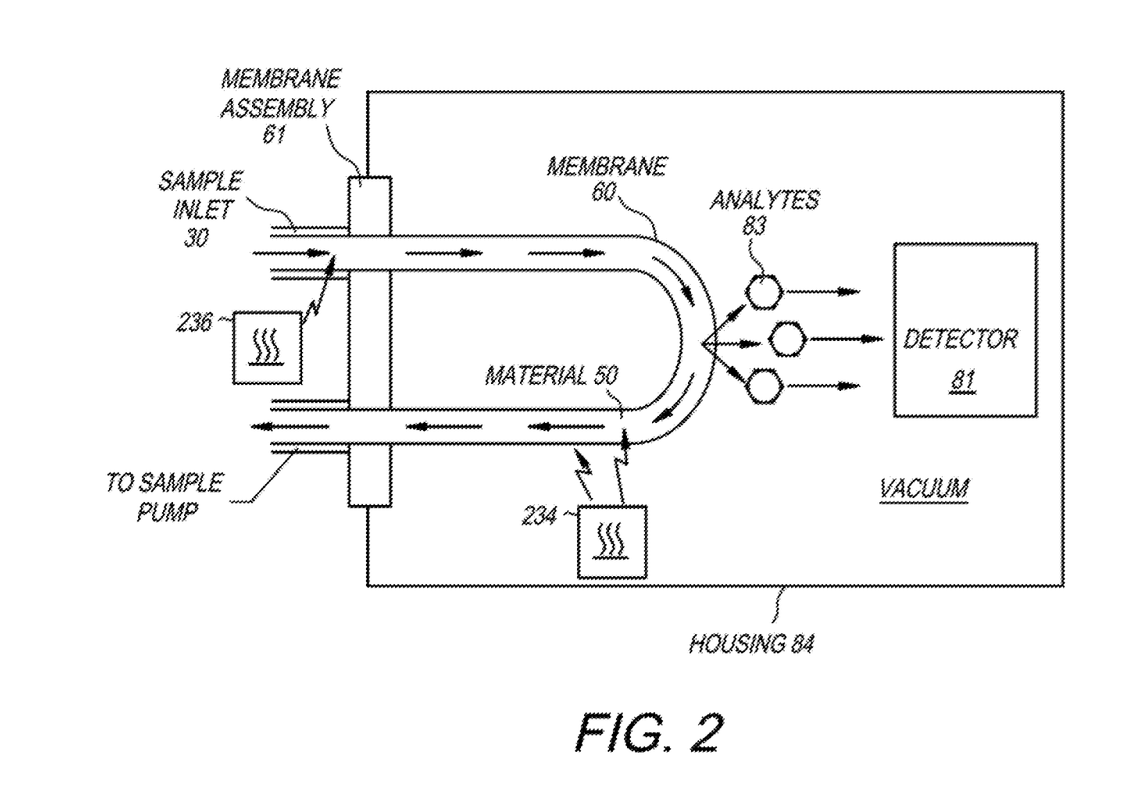

FIG. 2 shows a MIMS system. The membrane 60 is a tube that passes through the chamber, which is, e.g., pumped down to low pressures. A sample pump draws a stream of carrier fluid through the tube; the carrier fluid transports the analyte. This system advantageously permits trapping many contaminants at the entrance to the tube so analytes can flow through portions of the tube downstream of the entrance. Some analytes pass through the membrane 60 into the vacuum chamber and are detected by the detector 81. Exemplary detectors include, but are not limited, to, mass spectrometers (e.g., time of flight, quadrupole mass sensor, ion trap, or magnetic sector); photoionization detectors; optical detectors (e.g., to detect fluorescence, absorbance, or Raman scattering); metal oxide sensors; and quartz crystal micro balances. Some sensing technologies employ a vacuum in the housing of the chamber and some do not. The atmospheric composition and pressure inside the housing 84 can be selected based on the analytes to be detected and the operation of the detector. In various aspects, the MIMS system is used as a detection unit in a continuous process monitor (CPM). Instead of an inlet, the system is attached to a chamber or device in the process to be monitored. The membrane is directly exposed to the fluid (e.g., gas) in the chamber or device.

Various prior schemes use a heater in direct contact with the membrane. However, this increases the probability of "carryover" (material sticking to the heater). In various examples, the membrane 60 can be irradiated with photons (e.g., infrared) from an LED or diode laser. This permits heating only the membrane by picking a wavelength preferentially absorbed by the membrane, and doing so in a non-contact manner. Fast heating and cooling (no thermal mass in direct contact with membrane) can be performed. The diodes or other radiation sources can be arranged in the vacuum system or chamber. Any number of sources can be used, e.g., one more-powerful source or an array of less-powerful sources.

Figure 11:
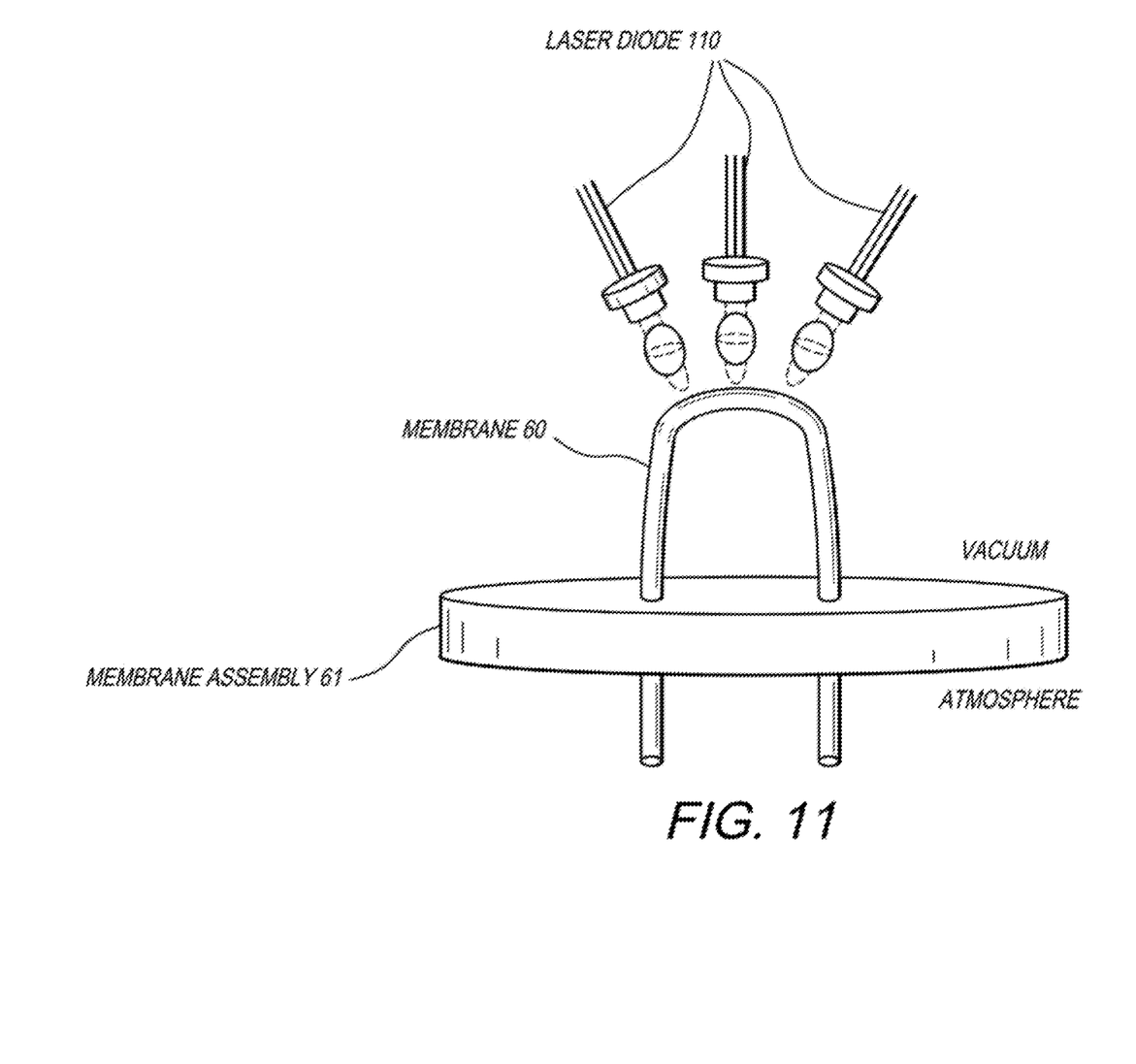
FIG. 11 is a graphical representation of an image of a radiation source.

FIG. 11 is a graphical representation of an image of an example of a radiation source. The radiation source can be any suitable type of radiation source, such as a laser diode or an LED. In this example, the radiation source is a laser diode 110. The laser diode 110 is arranged in the chamber such that the laser diode 110 is spaced apart from the membrane 60. In other words, the laser diode 110 is not in contact with the membrane 60. The laser diode 110 is adapted to emit a wavelength that is preferentially absorbed by the membrane 60. As the wavelength is absorbed by the membrane 60, the membrane 60 is heated. The membrane 60 can be heated before an analyte reaches the membrane 60. Accordingly, the laser diode 110 heats the membrane 60 in a non-contact manner.

Referring again to FIG. 2, in an example, heater 234 includes such a source. Heater 234 irradiates the membrane 60 or the material 50 in the tube formed by the membrane 60. Heater 234 can include one or more LEDs or laser diodes, e.g., in the telecommunications infrared wavelengths (e.g., λ=1310 nm). In another example, heater 236 irradiates or otherwise heats material 50 before it reaches inlet 30.

The length and thickness of membrane 60 can be selected based on expected concentrations of analytes 83 and material 50.

Figure 3:
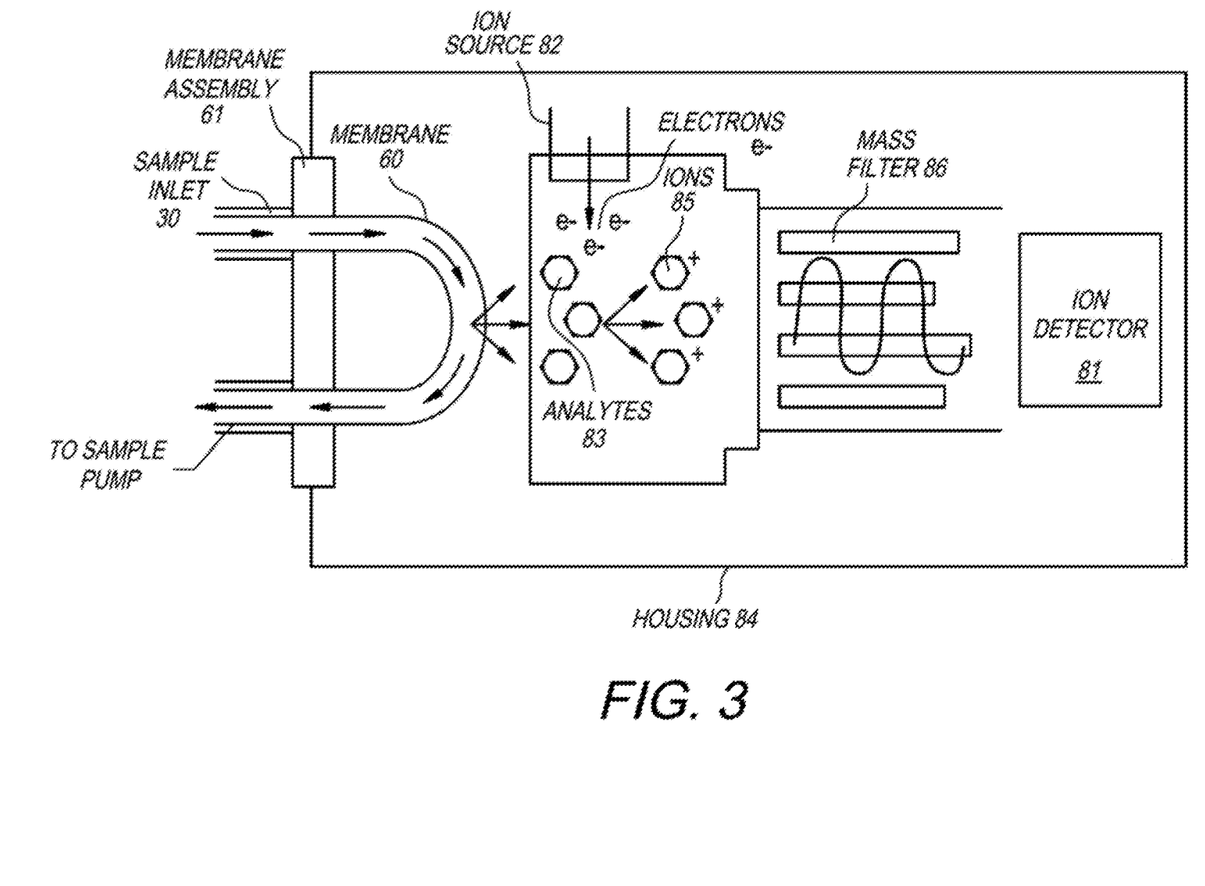

FIG. 3 shows a MIMS system similar to that shown in FIG. 2, specifically using a quadrupole-mass-filter mass spectrometer as the detector 81. Ionized analytes from the ion source 82, and other ions produced by bombarding the analytes with ions after the analytes 83 pass through the membrane 60, travel through the quadrupole mass filter 86 to the ion detector 81.

Figure 4:
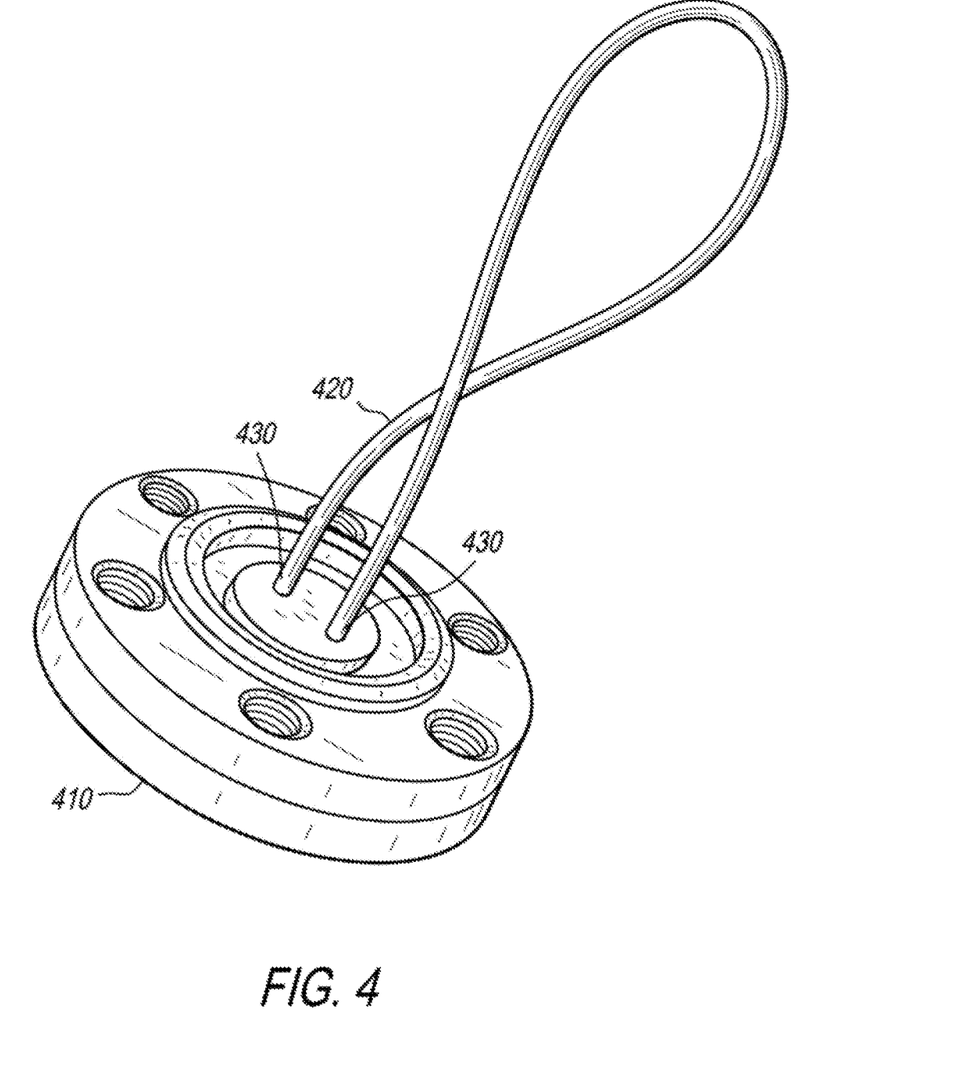
FIG. 4 is a graphical representation of an image of a membrane assembly.

FIG. 4 is a graphical representation of an image of a membrane assembly including flange 410 and membrane 420 in the form of a tube. Membrane 420 passes through flange 410 at inlets 430. The use of the term "inlet" throughout this disclosure does not restrict the direction of flow through inlet 430; inlets 430 can receive fluid into membrane 420 or pass fluid out of membrane 420. Membrane 420 can be arranged in a loop, as shown, or straight, or in another configuration.

Figure 5:
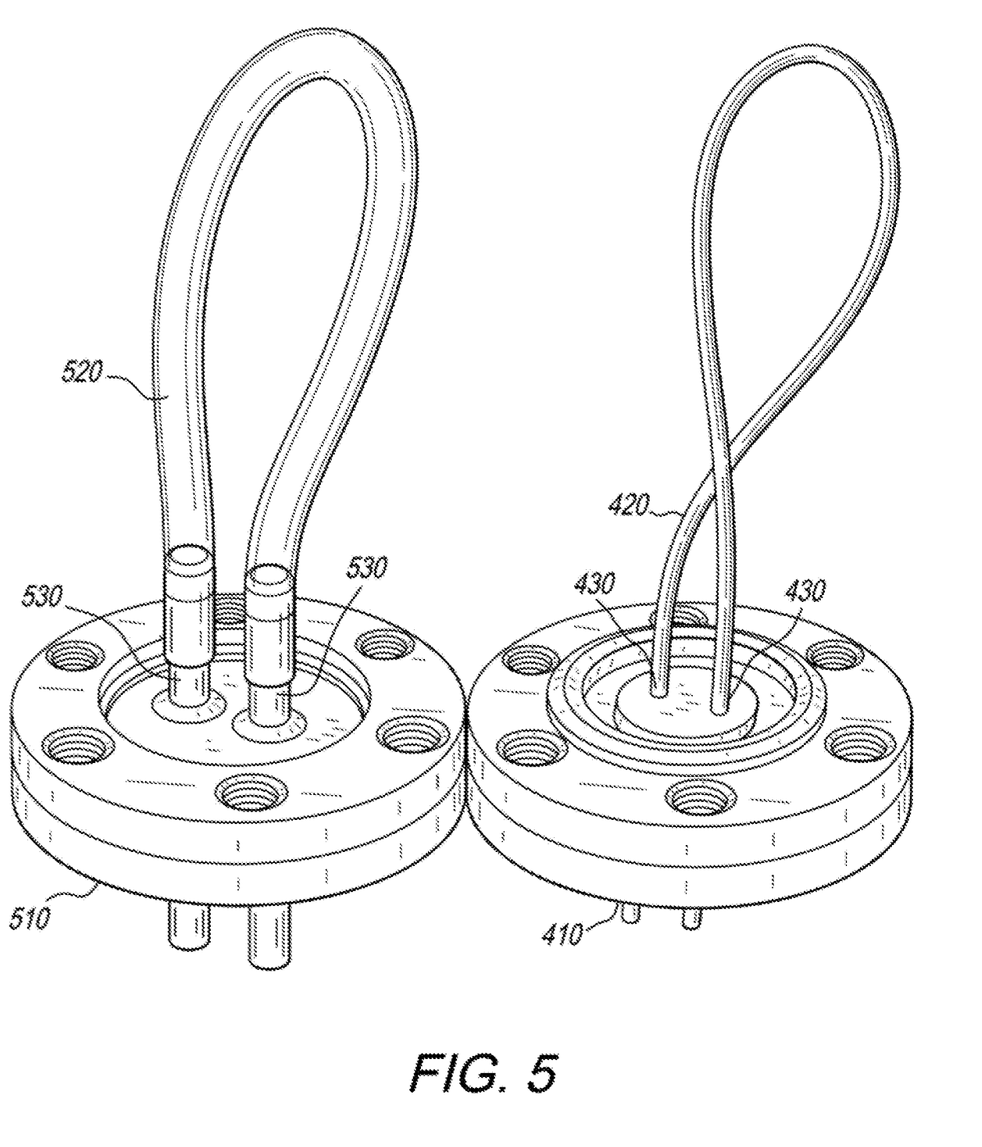
FIG. 5 is a graphical representation of an image of two membrane assemblies.

FIG. 5 is a graphical representation of an image of two membrane assemblies using different membranes 420, 520. Each has a flange 410, 510 and inlets 430, 530.

Figure 6:
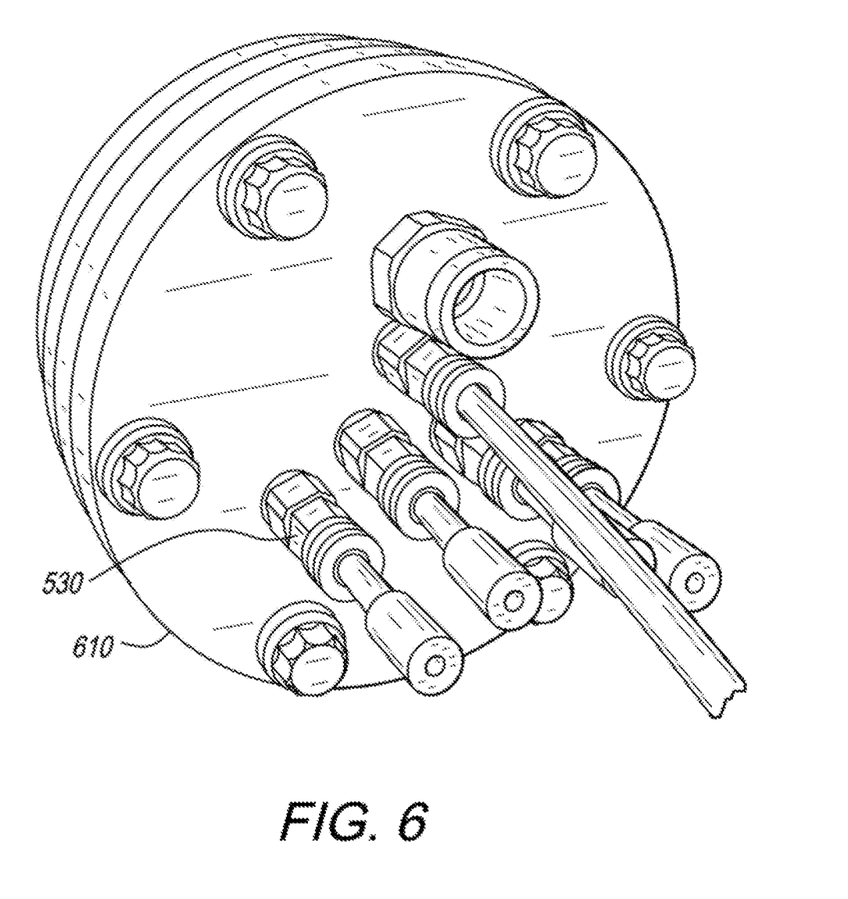
FIG. 6 is a graphical representation of an image of a membrane assembly.

FIG. 6 is a graphical representation of an image of a membrane assembly including a flange 610. Through the flange are arranged six inlets 530, one of which is connected to a tube and four of which are capped. As shown, inlets 530 can be different sizes. The six inlets 530 can support, for example, three different membrane tubes (e.g., tubes 420, 520, FIG. 5). The diameter of inlet 530 and the diameter of membrane 520 do not have to be the same. In various aspects, the flange, the membranes, or an assembly of the flange and one or more membrane(s) are line-replaceable units (LRUs), i.e., they can be replaced without sending the system back to the factory for repair.

Figure 7:
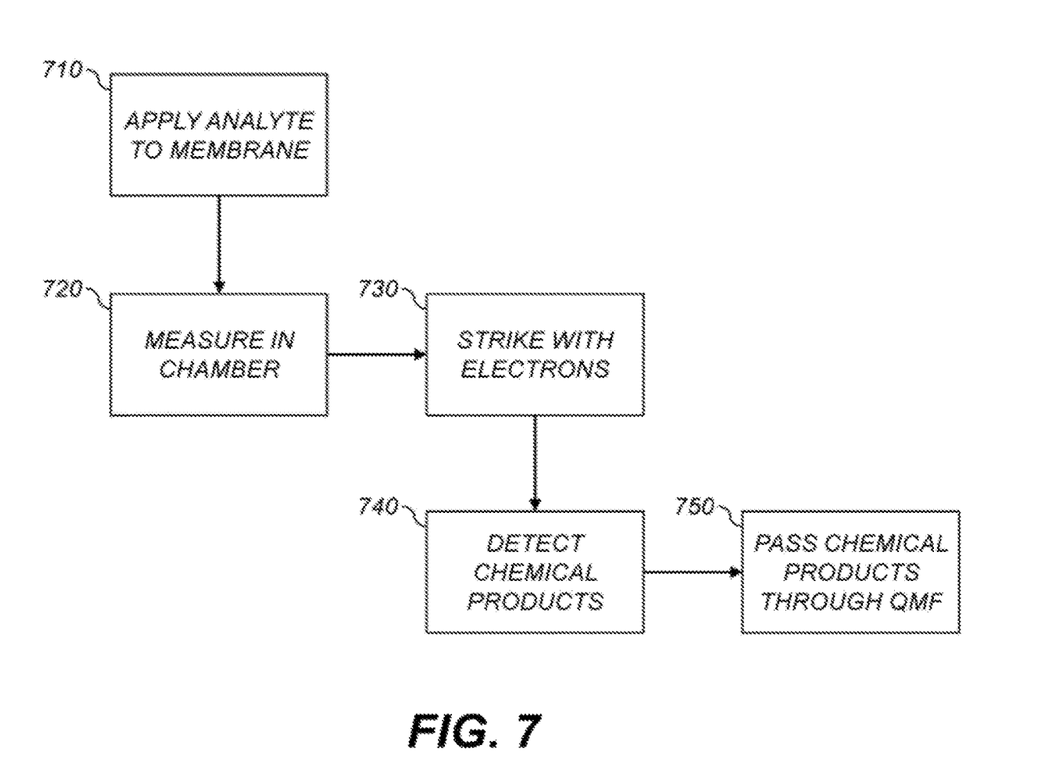
FIG. 7 is a flowchart of exemplary methods of measuring unsaturated hydrocarbons.

FIG. 7 shows a flowchart illustrating an exemplary method for measuring unsaturated hydrocarbons. The steps can be performed in any order except when otherwise specified, or when data from an earlier step is used in a later step. In at least one example, processing begins with step 710. For clarity of explanation, reference is herein made to various components shown in FIGS. 1-6 that can carry out or participate in the steps of the exemplary method. It should be noted, however, that other components can be used; that is, exemplary method(s) shown in FIG. 7 are not limited to being carried out by the identified components.

In step 710, an analyte is applied to (e.g., brought into contact with) a semi-permeable membrane sealing an inlet of a chamber. At least some unsaturated hydrocarbons in the analyte diffuse through the membrane into the chamber and at least some saturated hydrocarbons in the analyte are prevented from passing through the membrane.

In step 720, the unsaturated hydrocarbons in the chamber are measured using a detector, e.g., the quadrupole-mass-filter MS unit shown in FIG. 3.

In various aspects, step 720 includes step 730. In step 730, the unsaturated hydrocarbons in the chamber are struck with electrons or other charged or massive particles. In step 740, chemical products of that striking are detected using a mass spectrometer. Step 740 can include step 750 of passing the chemical products through a quadrupole mass filter ("QMF").

Figure 8:
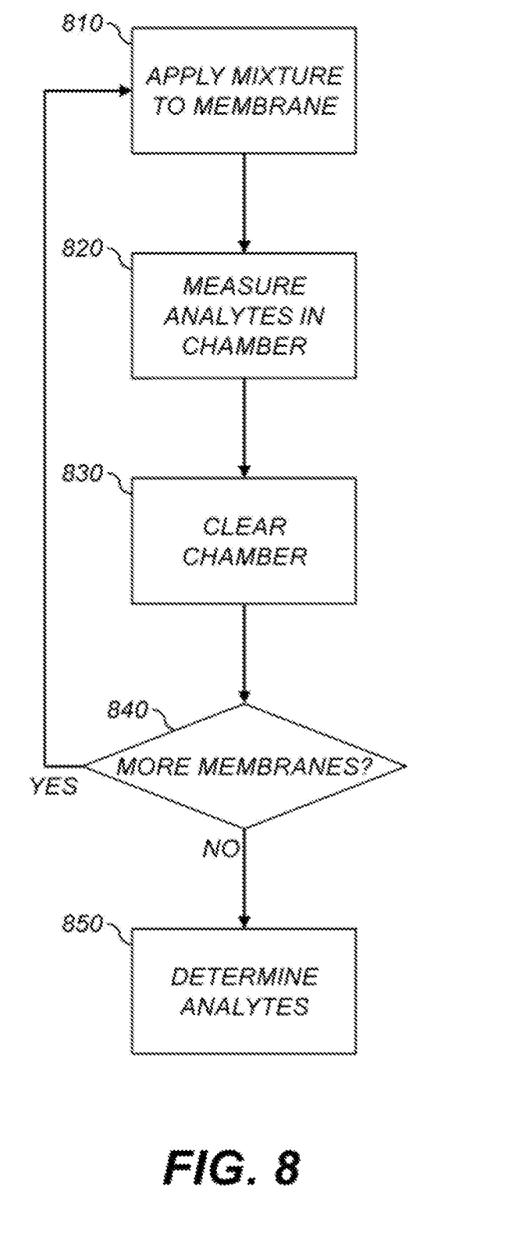
FIG. 8 is a flowchart of exemplary methods for determining the composition of a mixture.

FIG. 8 shows a flowchart illustrating an exemplary method for determining the composition of a mixture. The steps can be performed in any order except when otherwise specified, or when data from an earlier step is used in a later step. In at least one example, processing begins with step 810. For clarity of explanation, reference is herein made to various components shown in FIGS. 1-6 that can carry out or participate in the steps of the exemplary method. It should be noted, however, that other components can be used; that is, exemplary method(s) shown in FIG. 8 are not limited to being carried out by the identified components.

In step 810, the mixture 50 is applied to a semi-permeable membrane 60. Respective amount(s) of one or more analyte(s) pass through membrane 60 into a chamber 89.

In step 820, during or after application of the mixture 50 to the membrane 60, respective properties of the analyte(s) in the chamber are measured and stored. For example, if more than one analyte 83 passes through membrane 60, the concentration of each analyte 83 can be determined. The measurements can be measurements of concentration after a fixed time, or measurements of concentration as a function of time.

In optional step 830, the chamber is cleared after measuring and before applying the mixture to the next successive membrane. The measurement is taken while the mixture is applied in various embodiments. Clearing the chamber can include, e.g., pumping it back down, or removing analytes 83 using a cleaning device or solution.

In decision step 840, it is determined whether there are more membranes to use for testing. If so, the next step is step 810. If not, the next step is step 850.

In this way, the mixture is successively applies the mixture to a plurality of semi-permeable membranes having respective, different permeabilities to one or more substances. Measurements are taken of mixture 50 applied to membrane 60, then to membrane 61, . . . . In other aspects, measurements are taken in parallel using separate chambers 89 with respective detectors and respective, different membranes 60.

In step 850, using processor 986 (FIG. 9), the stored properties are automatically processed to determine concentration(s) of the analyte(s) in the mixture. In an example, measurements are taken in step 820 as mixture 50 is applied to membrane 60. The measured concentration at sensor 81 in rises at a certain rate until it saturates at a certain level. The rates are measured for each membrane. Each membrane has a different permeability to various analytes. For a mixture 50 containing two compounds A and B, and two membranes 1 and 2, let $S_1$ and $S_2$ be the measured rates with membranes 1 and 2, respectively. Let $k_{A1}$ be a known diffusion rate of A across membrane 1 per unit concentration of A, and likewise $k_{B1}$ for B and $k_{A2}$, $k_{B2}$ for A and B across membrane 2. Then $$k_{A1}c_A + k_{B1}c_B = S_1 \tag{1}$$

$$k_{A2}c_A + k_{B2}c_B = S_2 \tag{2}$$

$S_1$ and $S_2$ are measured and the four k values are known, so this is a two-equation system of two unknowns. Provided the system is not indeterminate (i.e., Eqs. (1) and (2) are linearly independent), it can be solved for the concentrations $c_A$ and $c_B$.

Figure 9:
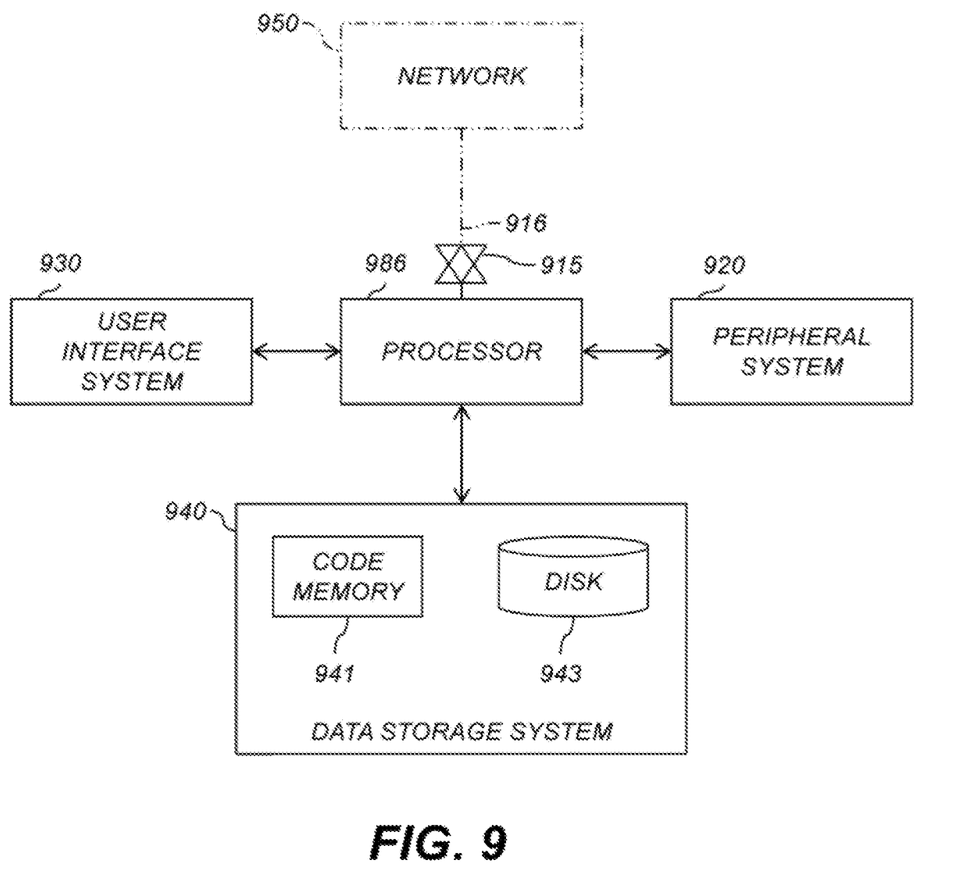
FIG. 9 is a high-level diagram showing the components of a data-processing system.

Other factors can also be taken into account. For example, rate can be affected by membrane thickness, temperature, composition, and the concentration of the analyte outside the chamber 89. Processor 986 can use sensors and calibration tables to compensate for these effects. The calibration tables can be developed by performing lab experiments on representative hardware at various conditions.

In view of the foregoing, various aspects provide detection of analytes. A technical effect of various aspects is to separate analytes physically and detect the analytes after separation. A technical effect of other aspects is to determine the respective concentrations of various components of a mixture.

FIG. 9 is a high-level diagram showing the components of an exemplary data-processing system for analyzing data and performing other analyses described herein, and related components. The system includes a processor 986, a peripheral system 920, a user interface system 930, and a data storage system 940. The peripheral system 920, the user interface system 930 and the data storage system 940 are communicatively connected to the processor 986. Processor 986 can be communicatively connected to network 950 (shown in phantom), e.g., the Internet or an X.95 network, as discussed below. Supply 42, sensor 91 (both FIG. 1), the detector shown in FIG. 2, or the ion detector shown in FIG. 3 can each include or be connected to one or more of systems 986, 920, 930, 940, and can each connect to one or more network(s) 950. Steps of methods shown in FIGS. 7-8 can be automatically carried out by processor 986, which can control supply 42, the ion source and mass filter shown in FIG. 3, or other detectors, electronics, or fluid handling devices, and which can receive data from sensor 91. Processor 986, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Processor 986 can implement processes of various aspects described herein. Processor 986 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise. Processor 986 can include Harvard-architecture components, modified-Harvard-architecture components, or Von-Neumann-architecture components.

The phrase "communicatively connected" includes any type of connection, wired or wireless, for communicating data between devices or processors. These devices or processors can be located in physical proximity or not. For example, subsystems such as peripheral system 920, user interface system 930, and data storage system 940 are shown separately from the data processing system 986 but can be stored completely or partially within the data processing system 986.

The peripheral system 920 can include one or more devices configured to provide digital content records to the processor 986. For example, the peripheral system 920 can include digital still cameras, digital video cameras, cellular phones, or other data processors. The processor 986, upon receipt of digital content records from a device in the peripheral system 920, can store such digital content records in the data storage system 940.

The user interface system 930 can include a mouse, a keyboard, another computer (connected, e.g., via a network or a null-modem cable), or any device or combination of devices from which data is input to the processor 986. The user interface system 930 also can include a display device, a processor-accessible memory, or any device or combination of devices to which data is output by the processor 986. The user interface system 930 and the data storage system 940 can share a processor-accessible memory.

In various aspects, processor 986 includes or is connected to communication interface 915 that is coupled via network link 916 (shown in phantom) to network 950. For example, communication interface 915 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WiFi or GSM. Communication interface 915 sends and receives electrical, electromagnetic or optical signals that carry digital or analog data streams representing various types of information across network link 916 to network 950. Network link 916 can be connected to network 950 via a switch, gateway, hub, router, or other networking device.

Processor 986 can send messages and receive data, including program code, through network 950, network link 916 and communication interface 915. For example, a server can store requested code for an application program (e.g., a JAVA applet) on a tangible non-volatile computer-readable storage medium to which it is connected. The server can retrieve the code from the medium and transmit it through network 950 to communication interface 915. The received code can be executed by processor 986 as it is received, or stored in data storage system 940 for later execution.

Data storage system 940 can include or be communicatively connected with one or more processor-accessible memories configured to store information. The memories can be, e.g., within a chassis or as parts of a distributed system. The phrase "processor-accessible memory" is intended to include any data storage device to or from which processor 986 can transfer data (using appropriate components of peripheral system 920), whether volatile or non-volatile; removable or fixed; electronic, magnetic, optical, chemical, mechanical, or otherwise. Exemplary processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the data storage system 940 can be a tangible non-transitory computer-readable storage medium, i.e., a non-transitory device or article of manufacture that participates in storing instructions that can be provided to processor 986 for execution.

In an example, data storage system 940 includes code memory 941, e.g., a RAM, and disk 943, e.g., a tangible computer-readable rotational storage device such as a hard drive. Computer program instructions are read into code memory 941 from disk 943. Processor 986 then executes one or more sequences of the computer program instructions loaded into code memory 941, as a result performing process steps described herein. In this way, processor 986 carries out a computer implemented process. For example, steps of methods described herein, blocks of the flowchart illustrations or block diagrams herein, and combinations of those, can be implemented by computer program instructions. Code memory 941 can also store data, or can store only code.

Example 1

A system for analyzing an analyte is described herein. The system includes a chamber having an inlet and a semi-permeable membrane arranged to seal the inlet. The semi-permeable membrane includes a cross-linked mixture of a first compound and a second compound. The first compound includes 0.0-75.0 wt. % of Dimethyl siloxane, dimethylvinyl-terminated, 15.0-35.0 wt. % of Silica, amorphous, 5.0-10.0 wt. % of Dimethyl siloxane, hydroxy-terminated, and 3.0-7.0 wt. % Dimethyl, methylvinyl siloxane, dimethylvinyl-terminated. The second compound includes 55.0-75.0 wt. % Dimethyl siloxane, dimethylvinyl-terminated, 15.0-35.0 wt. % Silica, amorphous, 5.0-10.0 wt. % Dimethyl siloxane, hydroxy-terminated, 3.0-7.0 wt. % Dimethyl, methylvinyl siloxane, dimethylvinyl-terminated, and 1.0-5.0 wt. % Dimethyl, methylhydrogen siloxane.

The system can include a detector. The chamber can be a vacuum chamber and the detector can be a mass spectrometer. The system can further include an ion source arranged in the chamber. The membrane can have a specific gravity at 25° C. substantially equal to 1.15. The membrane can have a Shore A durometer of approximately 50. The chamber can include a plurality of inlets and the system can further include a supply for providing the analyte, a plurality of semi-permeable membranes arranged to seal respective one of the plurality of inlets, and a connector adapted to selectively provide the analyte from the supply to each of the plurality of membranes. The analyte can include a chemical and two of the plurality of semi=permeable membranes can include respective different permeabilities to the chemical. The inlets can include aperture pairs and the system can further include a plurality of tubes having respective semi-permeable sidewalls, each tube passing into and out of the chamber via a respective one of the aperture pairs, and a detector arranged in the chamber and adapted to detect properties of a substance that passes through a sidewall of one of the tubes.

Example 2

A chemical-analysis system is described herein. The chemical-analysis system includes a vacuum chamber having an inlet and a semi-permeable membrane sealing the inlet. The chemical-analysis system further includes a radiation source arranged in the vacuum chamber, the radiation source spaced apart from the semi-permeable membrane and adapted to irradiate the semi-permeable membrane with electromagnetic radiation at a frequency at least partially absorbed by the semi-permeable membrane.

The chemical-analysis system can include a supply adapted to provide an analyte to an exterior side of the semi-permeable membrane, wherein the radiation source is to heat the membrane before the analyte reaches the membrane. The radiation source can be adapted to heat the semi-permeable membrane in a non-contact manner. The radiation source can be a laser diode. The laser diode can be adapted to heat the semi-permeable membrane by emitting a wavelength preferentially absorbed by the semi-permeable membrane. The radiation source can include a plurality of laser diodes.

Various aspects described herein may be embodied as systems or methods. Accordingly, various aspects herein may take the form of an entirely hardware aspect, an entirely software aspect (including firmware, resident software, micro-code, etc.), or an aspect combining software and hardware aspects These aspects can all generally be referred to herein as a "service," "circuit," "circuitry," "module," or "system."

Furthermore, various aspects herein may be embodied as computer program products including computer readable program code stored on a tangible non-transitory computer readable medium. Such a medium can be manufactured as is conventional for such articles, e.g., by pressing a CD-ROM. The program code includes computer program instructions that can be loaded into processor 986 (and possibly also other processors), to cause functions, acts, or operational steps of various aspects herein to be performed by the processor 986 (or other processor). Computer program code for carrying out operations for various aspects described herein may be written in any combination of one or more programming language(s), and can be loaded from disk 943 into code memory 941 for execution. The program code may execute, e.g., entirely on processor 986, partly on processor 986 and partly on a remote computer connected to network 950, or entirely on the remote computer.

The invention is inclusive of combinations of the aspects described herein. References to "a particular aspect" and the like refer to features that are present in at least one aspect of the invention. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting. The word "or" is used in this disclosure in a non-exclusive sense, unless otherwise explicitly noted.

The invention has been described in detail with particular reference to certain preferred aspects thereof, but it will be understood that variations, combinations, and modifications can be effected by a person of ordinary skill in the art within the spirit and scope of the invention.

The invention claimed is:

1. A chemical-analysis system, comprising:
   a vacuum chamber having at least a first inlet and a second inlet;
   at least two semi-permeable membranes, wherein a first semi-permeable membrane seals the first inlet and is configured to carry a supply material comprising an analyte and a second semi-permeable membrane seal the second inlet and configured to carry a the supply material; and
   a radiation source arranged in the vacuum chamber, the radiation source spaced apart from the first and second semi-permeable membranes and the supply material, wherein the radiation source is adapted to irradiate the first and second semi-permeable membranes with electromagnetic radiation at a frequency at least partially absorbed by the first and second semi-permeable membranes,
   wherein when one of the at least two semi-permeable membranes fails, the supply material is diverted into another of the at least two semi-permeable membranes, wherein the radiation source is configured to heat the at least two semi-permeable membranes before the analyte reaches a membrane surface.

2. The chemical-analysis system of claim 1, wherein the radiation source is adapted to heat the at least two semi-permeable membranes in a non-contact manner.

3. The chemical-analysis system of claim 1, wherein the radiation source comprises a laser diode.

4. The chemical-analysis system of claim 3, wherein the laser diode is adapted to heat the at least two semi-permeable membranes by emitting a wavelength preferentially absorbed by the at least two semi-permeable membranes.

5. The chemical-analysis system of claim 1, wherein the radiation source comprises a plurality of laser diodes.

6. The chemical-analysis system of claim 1, wherein one of the at least two semi-permeable membranes is in form of a tube extending from the first inlet into the vacuum chamber.

7. The chemical-analysis system of claim 6, wherein the radiation source is adapted to irradiate a material within the tube.

8. The chemical-analysis system of claim 7, wherein the radiation source is adapted to irradiate the supply material prior to the material reaching one of the first and second inlets.

9. The chemical-analysis system of claim 1, wherein the radiation source comprises an LED.

10. The chemical-analysis system of claim 1, wherein the radiation source comprises a plurality of LEDs.

11. The chemical-analysis system of claim 1, wherein one of the first semi-permeable membrane and the second semi-permeable membrane comprises a flat membrane shape.

12. The chemical-analysis system of claim 1, wherein one of the at least two semi-permeable membranes comprises a different degree of permeability to the analyte than another of the at least two semi-permeable membranes.

13. The chemical-analysis system of claim 12, wherein the supply material is successively applied into one of the at least two semi-permeable membranes and then into another of the at least two semi-permeable membranes, and wherein the vacuum chamber is cleared between the successive applications of supply material.

14. The chemical-analysis system of claim 1, wherein the at least two semi-permeable membranes have a different composition from each other.

15. A chemical-analysis system comprising:
   a vacuum chamber comprising at least a first inlet and a second inlet;
   a first semi-permeable membrane fluidly connected to the first inlet and at least partially positioned in the vacuum chamber,
   a second semi-permeable membrane fluidly connected to the second inlet and at least partially positioned in the vacuum chamber;
   a supply configured to successively apply supply material into the first semi-permeable membrane and the second semi-permeable membrane, wherein the vacuum chamber is cleared between the successive applications of supply material, and wherein the supply material comprises one or more analytes; and
   a radiation source arranged in the vacuum chamber, the radiation source spaced apart from the first and second semi-permeable membranes and the supply material, wherein the radiation source is adapted to irradiate the first and second semi-permeable membranes with electromagnetic radiation at a frequency at least partially absorbed by the first and second semi-permeable membranes, wherein the first semi-permeable membrane comprises a different degree of permeability to at least one of the one or more analytes of the supply material than the second semi-permeable membrane.

16. The chemical-analysis system of claim 15, wherein at least one of the first semi-permeable membrane and the second semi-permeable membrane comprises a flat membrane shape.

17. The chemical-analysis system of claim 15, wherein at least one of the first semi-permeable membrane and the second semi-permeable membrane are in form of a tube extending into the vacuum chamber.

18. The chemical-analysis system of claim 15, wherein the first semi-permeable membrane is a different composition that the second semi-permeable membrane.

* * * * *

UNITED STATES PATENT AND TRADEMARK OFFICE
CERTIFICATE OF CORRECTION

| | | |
|---|---|---|
| PATENT NO. | : 10,985,000 B2 | Page 1 of 1 |
| APPLICATION NO. | : 15/882173 | |
| DATED | : April 20, 2021 | |
| INVENTOR(S) | : Kenneth C. Wright and Guido F. Verbeck | |

It is certified that error appears in the above-identified patent and that said Letters Patent is hereby corrected as shown below:

In the Claims

Claim 1: Column 12 Line 51 change "seal" to --seals--

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*